United States Patent
Yen et al.

(10) Patent No.: US 8,466,901 B2
(45) Date of Patent: Jun. 18, 2013

(54) OPTICAL TOUCH SYSTEM HAVING INTEGRATED OPTICAL TOUCH APPARATUS AND PANEL APPARATUS AND OPERATING METHOD THEREOF

(75) Inventors: Meng-Shin Yen, Taipei (TW); William Wang, Taoyuan (TW); Chung-Cheng Chou, Lujhu Township, Taoyuan County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 423 days.

(21) Appl. No.: 12/813,611

(22) Filed: Jun. 11, 2010

(65) Prior Publication Data

US 2010/0321344 A1  Dec. 23, 2010

(30) Foreign Application Priority Data

Jun. 23, 2009  (TW) ................. 98121042 A

(51) Int. Cl.
*G06F 3/042* (2006.01)
(52) U.S. Cl.
USPC ........................ 345/175; 178/18.09
(58) Field of Classification Search
USPC ........................ 345/175; 178/18.09
See application file for complete search history.

(56) References Cited

U.S. PATENT DOCUMENTS

| | | | | |
|---|---|---|---|---|
| 4,847,606 A * | 7/1989 | Beiswenger | ........... | 345/175 |
| 4,880,969 A * | 11/1989 | Lawrie | ........... | 345/173 |
| 4,916,308 A * | 4/1990 | Meadows | ........... | 345/175 |
| 4,951,035 A * | 8/1990 | Beiswenger | ........... | 345/175 |
| 5,422,494 A * | 6/1995 | West et al. | ........... | 250/551 |
| 5,764,223 A * | 6/1998 | Chang et al. | ........... | 345/175 |
| 6,864,882 B2 * | 3/2005 | Newton | ........... | 345/175 |
| 7,042,444 B2 * | 5/2006 | Cok | ........... | 345/175 |
| 7,098,592 B2 * | 8/2006 | Nishikawa | ........... | 313/506 |
| 7,133,032 B2 * | 11/2006 | Cok | ........... | 345/175 |
| 7,679,610 B2 * | 3/2010 | Cernasov | ........... | 345/175 |
| 7,880,732 B2 * | 2/2011 | Goertz | ........... | 345/175 |
| 8,130,210 B2 * | 3/2012 | Saxena et al. | ........... | 345/175 |
| 2004/0140960 A1 * | 7/2004 | Cok | ........... | 345/175 |
| 2004/0140961 A1 * | 7/2004 | Cok | ........... | 345/175 |
| 2004/0212603 A1 * | 10/2004 | Cok | ........... | 345/175 |
| 2005/0168134 A1 * | 8/2005 | Nishikawa | ........... | 313/500 |
| 2005/0237317 A1 * | 10/2005 | Cok | ........... | 345/173 |
| 2006/0114244 A1 * | 6/2006 | Saxena et al. | ........... | 345/175 |
| 2007/0024598 A1 * | 2/2007 | Miller et al. | ........... | 345/175 |
| 2007/0165008 A1 * | 7/2007 | Crockett | ........... | 345/175 |
| 2008/0079687 A1 * | 4/2008 | Cernasov | ........... | 345/102 |

(Continued)

FOREIGN PATENT DOCUMENTS

| JP | 2004-303172 | * 10/2004 |
|---|---|---|
| JP | 2008-186374 | * 8/2008 |

*Primary Examiner* — Adam J Snyder

(57) ABSTRACT

An optical touch system is disclosed. The optical touch system comprises a panel apparatus and an optical touch apparatus. The panel apparatus includes a first position and a second position. The optical touch apparatus includes a light emitting module, a light path adjusting module, a light sensing module, and a processing module. The light emitting module and the light sensing module are set on the first position and the second position respectively. The light emitting module emits a sensing light, and the sensing light is reflected by the light path adjusting module to form a reflected light. The light sensing module receives the reflected light and generates a sensing result according to whether the light sensing module receives the reflected light. The processing module determines the touch point position formed on the panel apparatus according to the sensing result.

17 Claims, 6 Drawing Sheets

U.S. PATENT DOCUMENTS

| | | | |
|---|---|---|---|
| 2008/0231791 A1* | 9/2008 | Tanabe et al. | 349/150 |
| 2008/0278460 A1* | 11/2008 | Arnett et al. | 345/175 |
| 2009/0002329 A1* | 1/2009 | Van Genechten et al. | 345/173 |
| 2009/0058832 A1* | 3/2009 | Newton | 345/175 |

* cited by examiner

OPTICAL TOUCH SYSTEM HAVING INTEGRATED OPTICAL TOUCH APPARATUS AND PANEL APPARATUS AND OPERATING METHOD THEREOF

BACKGROUND OF THE INVENTION

1. Field of the invention

The present invention relates to a touch apparatus, and more particularly, to an optical touch system capable of integrating the optical touch apparatus and the panel apparatus to save the usage space and enlarge the range of the effective sensing region and operating method thereof.

2. Description of the prior art

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus.

Please refer to FIG. 1. FIG. 1 shows a side view of the conventional optical touch apparatus set on the panel. As shown in FIG. 1, the conventional optical touch apparatus 1 includes a light emitter 12, a light receiver 14, and a processor 16, wherein the light emitter 12 and the light receiver 14 are set at two different sides on the panel apparatus 9; the processor 16 is coupled to the light emitter 12 and the light receiver 14. After the light emitter 12 emits a sensing light, the light receiver 14 will receive the sensing light. If the sensing light is exactly blocked by an object and the light receiver 14 fails to receive the sensing light, the optical touch apparatus 1 will accordingly determine the touch point position formed by the object on the panel apparatus 9.

However, as shown in FIG. 1, since the optical touch apparatus 1 and the panel apparatus 9 are not integrated, and the light emitter 12 and the light receiver 14 are only simply set on the panel apparatus 9, therefore, the additional requirement of the panel apparatus 9 will be caused, it is disadvantageous for the current electronic products which stress on the feature of small volume. Additionally, the range of the effective sensing region is limited due to the configuration of the conventional optical touch apparatus 1 on the panel apparatus 9. Therefore, the invention provides an optical touch system and operating method thereof to solve the aforementioned problems.

SUMMARY OF THE INVENTION

A first embodiment of the invention is an optical touch system. In this embodiment, the optical touch system includes a panel apparatus and an optical touch apparatus. The panel apparatus includes a first position and a second position different from the first position. The optical touch apparatus includes a light emitting module, a light path adjusting module, a light sensing module, and a processing module, wherein the light emitting module and the light sensing module are set on the first position and the second position respectively. After the light emitting module emits a sensing light, the light path adjusting module will reflect the sensing light to form a reflected light. The light sensing module receives the reflected light and generates a sensing result according to whether the light sensing module receives the reflected light. The processing module determines the touch point position on the surface according to the sensing result.

The second embodiment of the invention is an optical touch system operating method. In this embodiment, the optical touch system includes a panel apparatus and an optical touch apparatus. The panel apparatus includes a first position and a second position different from the first position. The optical touch apparatus includes a light emitting module, a light path adjusting module, a light sensing module, and a processing module, wherein the light emitting module and the light sensing module are set on the first position and the second position respectively. The method includes the following steps of: (a) the light emitting module emits a sensing light; (b) the light path adjusting module reflects the sensing light to form a reflected light; (c) the light sensing module receives the reflected light and generates a sensing result according to whether the light sensing module receives the reflected light; (d) the processing module determines the touch point position on the surface according to the sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 4A:
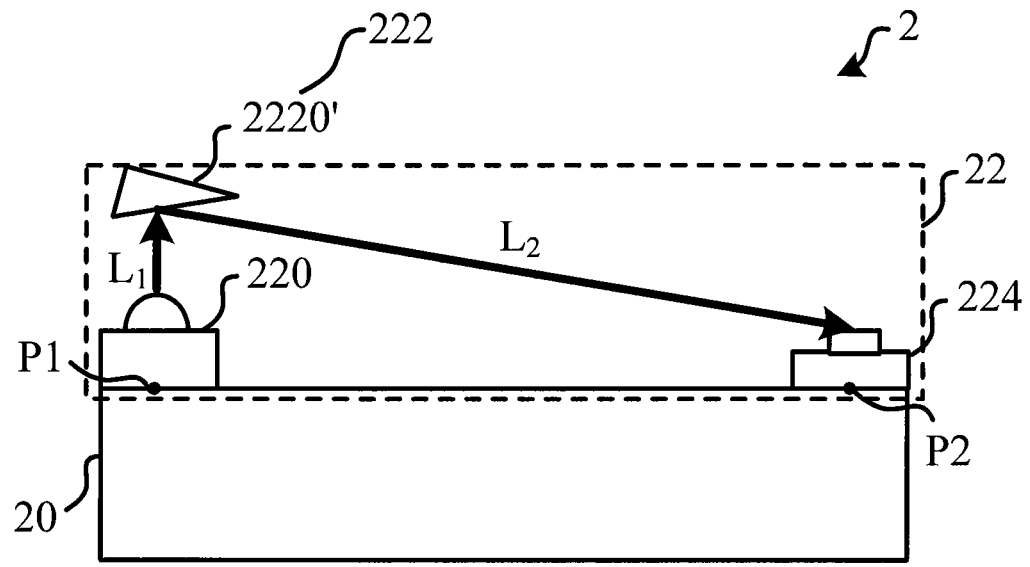
Figure 4B:
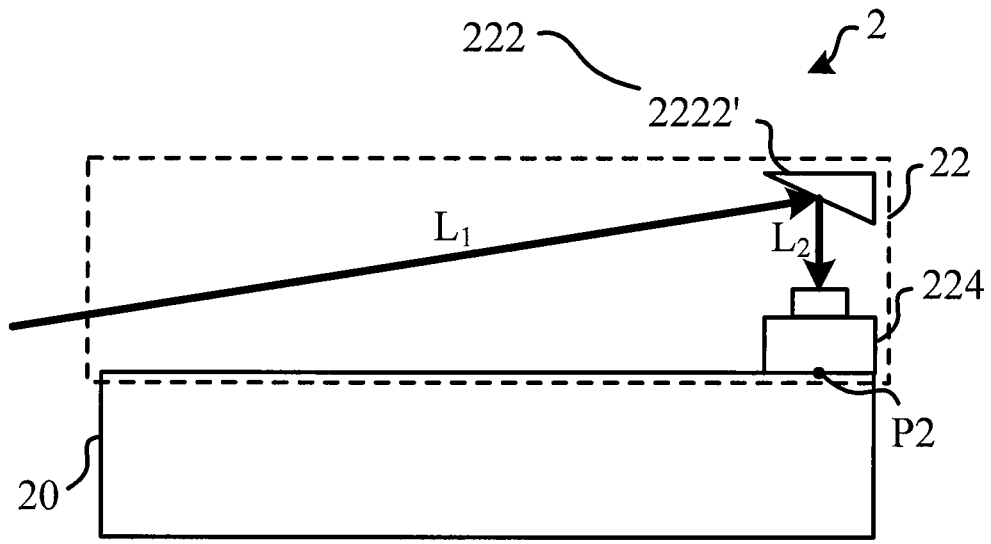
Figure 4C:
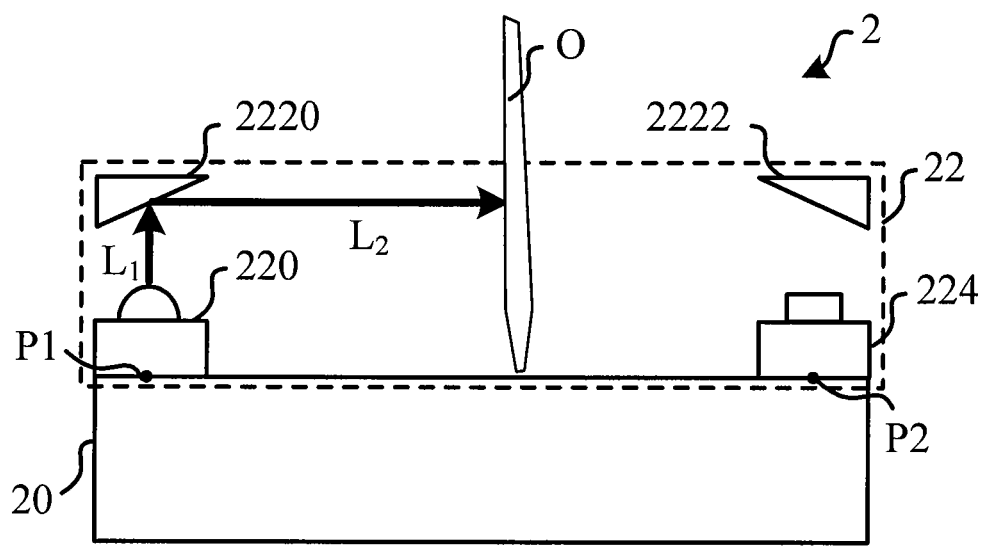

FIG. 4(A) and FIG. 4(B) illustrate scheme diagrams of the light path adjusting unit set above the left side and the right side of the top surface; FIG. 4(C) illustrates a scheme diagram of the first reflected light being blocked by the object in the way of being transmitted to the second light path adjusting unit.

Figure 5:
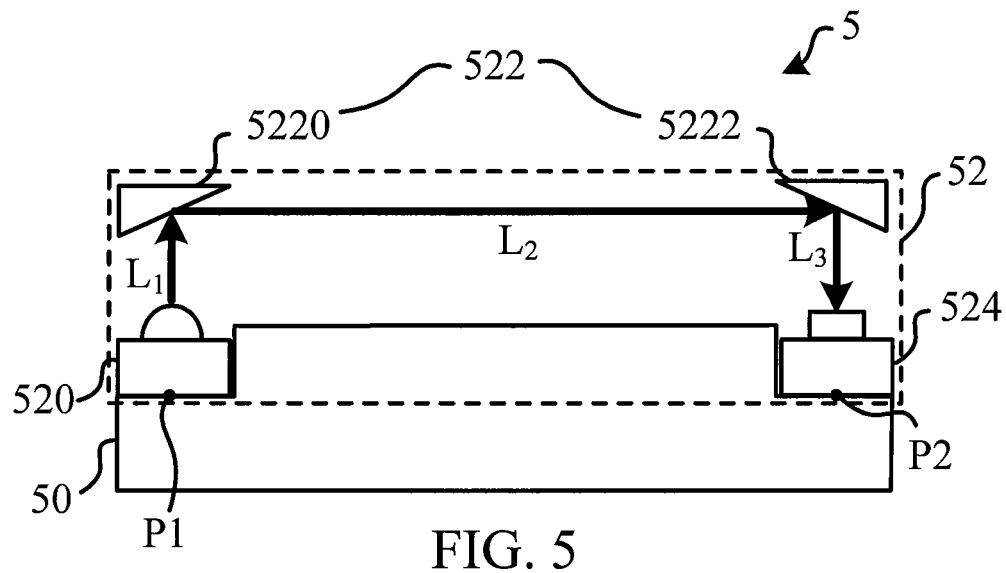

FIG. 5 illustrates a scheme diagram of the light emitting module and the light sensing module of the optical touch system being set in the concave part of the panel apparatus.

Figure 6:
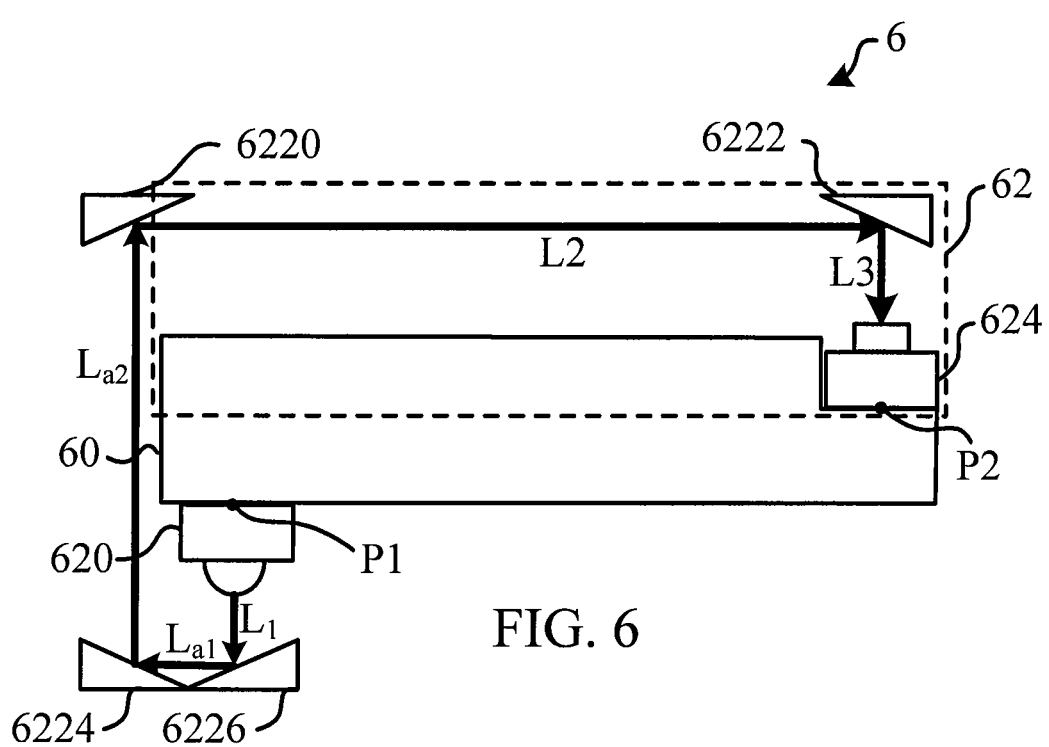

FIG. 6 illustrates a scheme diagram of the light emitting module and the light sensing module of the optical touch system being set in different surfaces of the panel apparatus.

Figure 7:
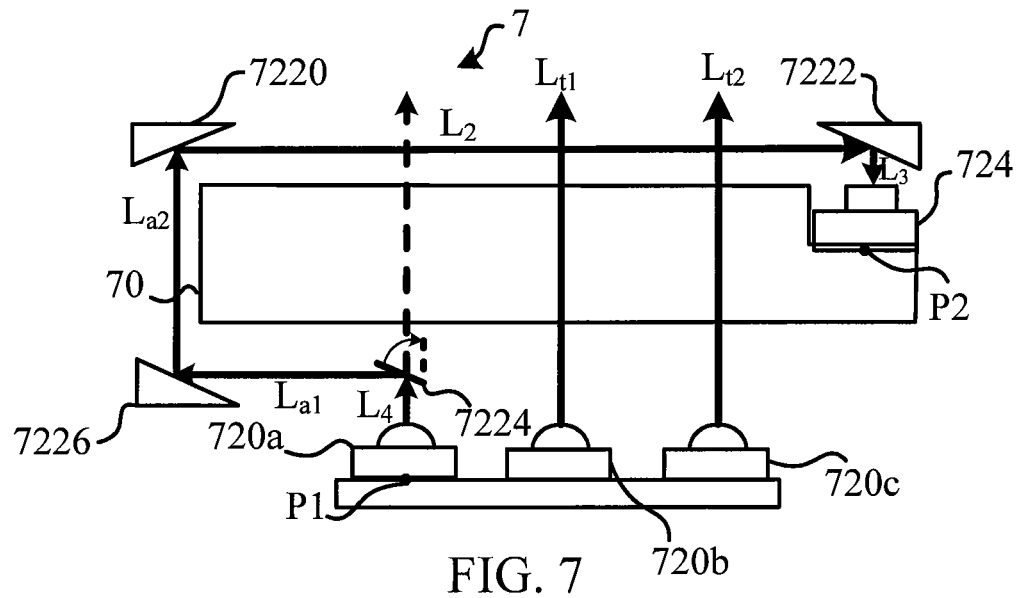

FIG. 7 illustrates a scheme diagram of the optical touch system rotating different angles to switch different scanning modes via the first auxiliary light path adjusting unit.

Figure 8:
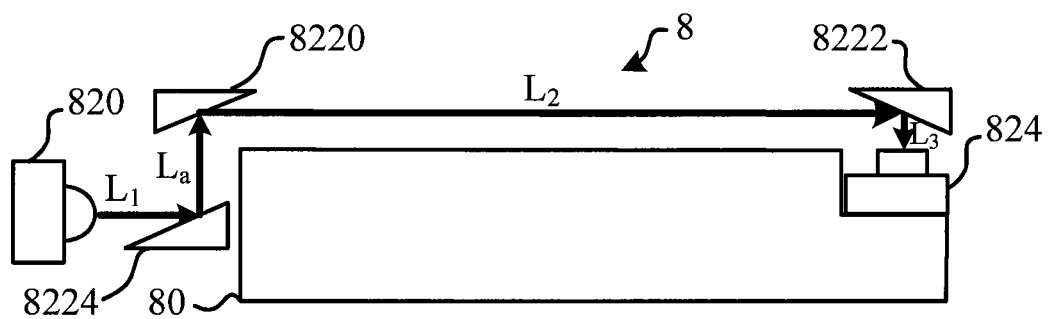

FIG. 8 illustrates a scheme diagram of the optical touch system using the lateral light source emitter of the panel apparatus as the light emitting module.

Figure 9:
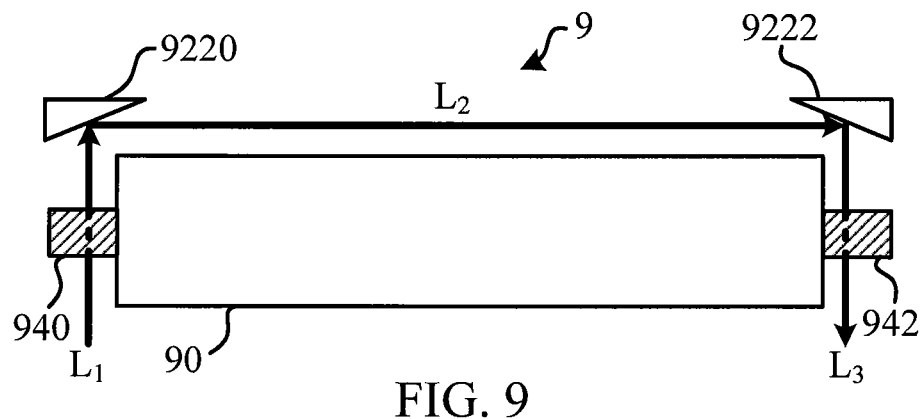

FIG. 9 illustrates an example of the optical touch system including different types of light path adjusting units with different functions.

Figure 10:
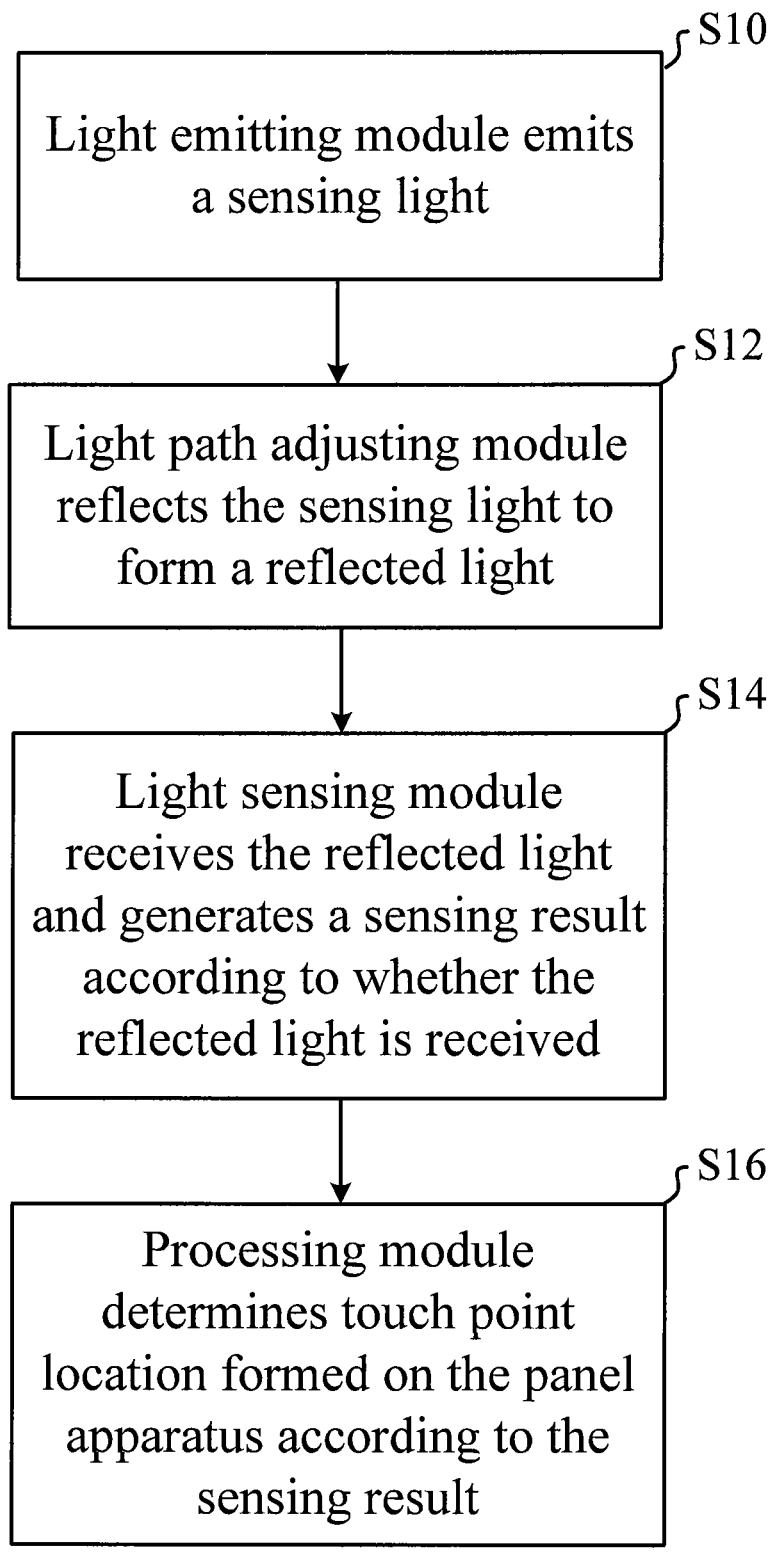

FIG. 10 illustrates a flowchart of the optical touch system operating method in the second embodiment of the invention.

DETAILED DESCRIPTION OF THE INVENTION

Figure 1:
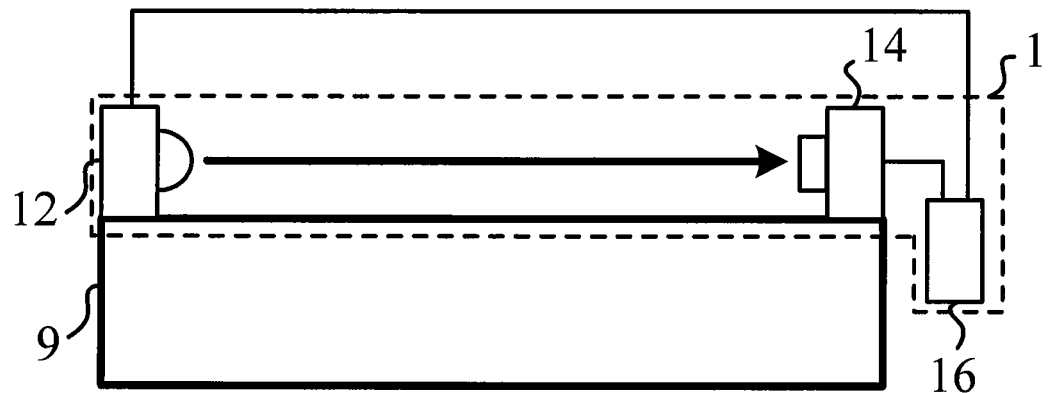
FIG. 1 illustrates a side view of the conventional optical touch apparatus set on the panel.
Figure 2:
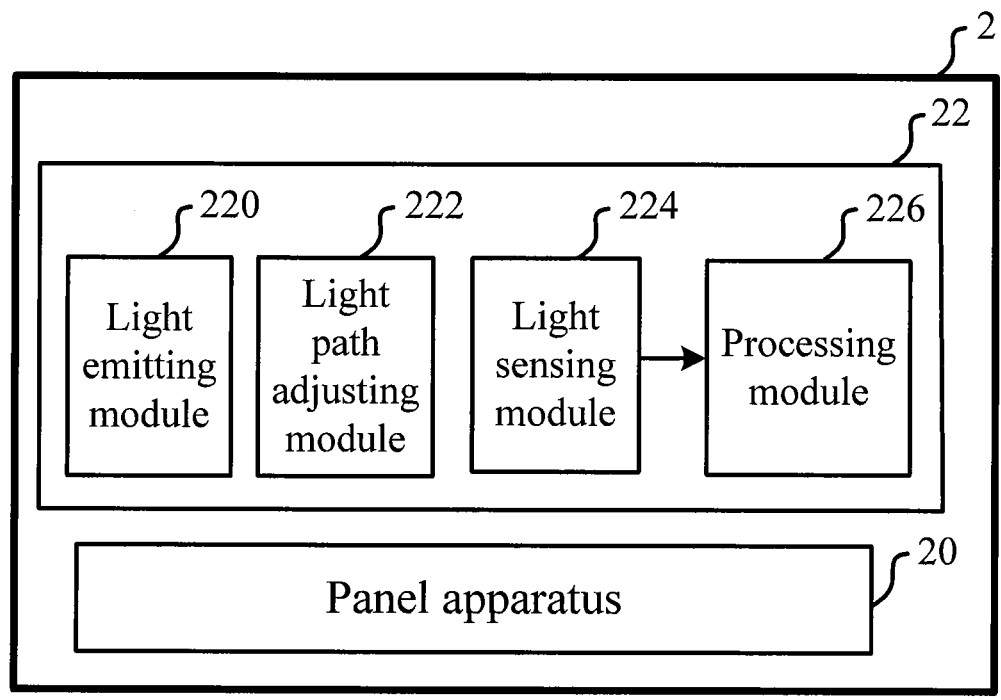
FIG. 2 and FIG. 3 illustrate a functional block diagram and a scheme diagram of the optical touch system in the first embodiment of the invention respectively.
Figure 3:
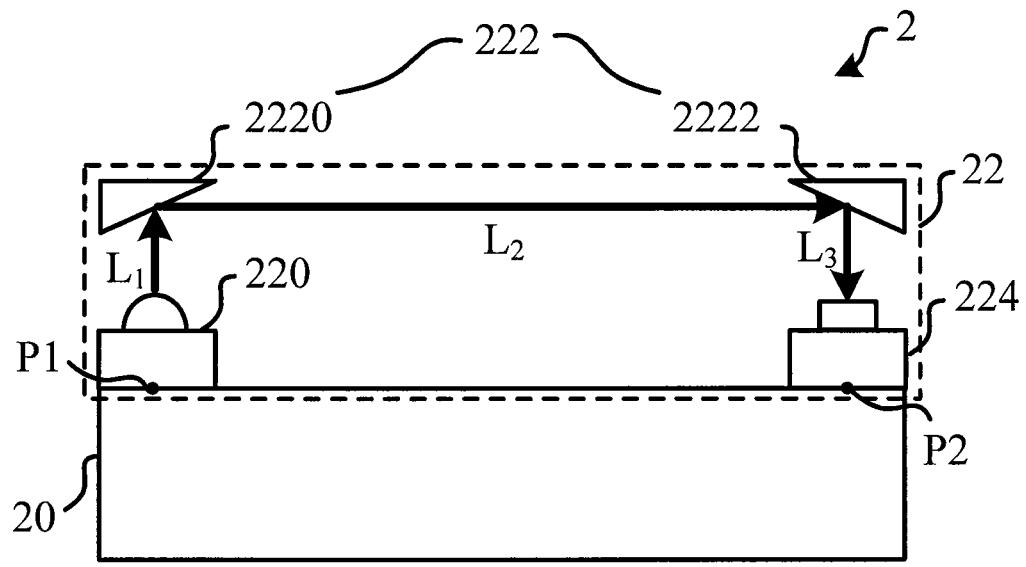

A first embodiment of the invention is an optical touch system. Please refer to FIG. 2 and FIG. 3. FIG. 2 and FIG. 3 illustrate a functional block diagram and a scheme diagram of the optical touch system respectively. As shown in FIG. 2 and FIG. 3, the optical touch system 2 includes a panel apparatus 20 and an optical touch apparatus 22, wherein the panel apparatus 20 includes a first position P1 and a second position P2 different from the first position P1; the optical touch apparatus 22 includes a light emitting module 220, a light path adjusting module 222, a light sensing module 224, and a processing module 226. The light emitting module 220 and the light sensing module 224 are set on the first position P1 and the second position P2 respectively. In fact, the number of the light emitting module 220 and the light sensing module 224 has no limitations.

As shown in FIG. 3, the light path adjusting module 222 includes a first light path adjusting unit 2220 and a second light path adjusting unit 2222; the first position P1 of the light emitting module 220 and the second position P2 of the light sensing module 224 are set at the left side and the right side of the top surface of the panel apparatus 20 respectively; the first light path adjusting unit 2220 and the second light path adjusting unit 2222 are set above the left side and the right side of the top surface respectively, that is to say, the first light path adjusting unit 2220 and the second light path adjusting unit 2222 correspond to the light emitting module 220 and the light sensing module 224 respectively. In this embodiment, the sensing light $L_1$ emitted from the light emitting module 220 will be reflected by the corresponding first light path adjusting unit 2220 to form a first reflected light $L_2$. The first reflected light $L_2$ will be transmitted above the first surface to form a light distributing region. As shown in FIG. 3, since there is no object blocking the progress of the first reflected light $L_2$ above the first surface, therefore, the first reflected light $L_2$ will be reflected by the second light path adjusting unit 2222 to form a second reflected light $L_3$ emitted to the light sensing module 224.

In fact, the number and the positions of the light path adjusting units of the light path adjusting module 222 can be determined based on practical requirements, but not limited to this case. For example, as shown in FIG. 4(A), the light path adjusting module 222 can also include only single light path adjusting unit 2220' disposed above the left side of the top surface of the panel apparatus 20, that is to say, the light path adjusting unit 2220' corresponds to the light emitting module 220, since both the angle and the position of the light path adjusting unit 2220' can be adjusted, so that in this embodiment, the light path adjusting unit 2220' can reflect the sensing light $L_1$ emitted from the light emitting module 220 to form the reflected light $L_2$ and the reflected light $L_2$ will be directly emitted to the light sensing module 224. As to FIG. 4(B), FIG. 4(B) shows a scheme diagram of the light path adjusting unit 2222' set above the right side of the top surface of the panel apparatus 20. The light path adjusting unit 2222' can also reflect the sensing light $L_1$ to form the reflected light $L_2$ and the reflected light $L_2$ is directly emitted to the light sensing module 224. It should be noticed that the sensing light $L_1$ can be emitted from the light emitting module or any lights from outside without any limitations. As shown in FIG. 4(C), if the first reflected light $L_2$ in FIG. 3 is blocked by the object O in a way of being transmitted to the second light path adjusting unit 2222 above the top surface, since the first reflected light $L_2$ can not be reflected by the second light path adjusting unit 2222, the light sensing module 224 can not receive the second reflected light $L_3$. By doing so, the light sensing module 224 can generate a sensing result according to whether the light sensing module 224 receives the second reflected light $L_3$.

Please refer to FIG. 5. FIG. 5 illustrates a scheme diagram of the light emitting module and the light sensing module of the optical touch system being set in the concave part of the panel apparatus. As shown in FIG. 5, a first concave part and a second concave part are set at the left side and the right side of the top surface of the panel apparatus 50 respectively, the first position P1 of the light emitting module 520 and the second position P2 of the light sensing module 524 are disposed in the first concave part and the second concave part, so that the space used by the entire optical touch system 5 will be further saved. It should be noticed that since the direction of the sensing light $L_1$ emitted from the light emitting module 520 is vertical to the top surface and reflected by the corresponding light path adjusting unit 5220 to form the first reflected light $L_2$, then the first reflected light $L_2$ is emitted to the second light path adjusting unit 5222, and the second light path adjusting unit 5222 will reflect the first reflected light $L_2$ to form the second reflected light $L_3$, and then the second reflected light $L_3$ is emitted to the light sensing module 524. Therefore, with this configuration of the optical touch system 5, no matter the sensing light $L_1$ emitted from the light emitting module 520, the first reflected light $L_2$ reflected by the first light path adjusting unit 5220, or the second reflected light $L_2$ reflected by the second light path adjusting unit 5222 will not be blocked by the panel apparatus 50. Moreover, the entire space and volume used by the optical touch system 5 will be largely reduced compared to the prior art, so that the goal of smaller volume and less weight of the optical touch system 5 can be achieved.

Please refer to FIG. 6. FIG. 6 illustrates a scheme diagram of the light emitting module and the light sensing module of the optical touch system being set in different surfaces of the panel apparatus. As shown in FIG. 6, in the optical touch system 6, the first position P1 of the light emitting module 620 is at the left side of the bottom surface of the panel apparatus 60, and the second position P2 of the light sensing module 624 is at the right side concave part of the top surface of the panel apparatus 60. In this embodiment, the light emitting module 620 on the bottom surface of the panel apparatus 60 emits the sensing light $L_1$ downward, and the sensing light $L_1$ will pass the first auxiliary light path adjusting unit 6226 and is reflected to form a first auxiliary reflected light $L_{a1}$, and then the first auxiliary reflected light $L_{a1}$ is reflected by the second auxiliary light path adjusting unit 6224 to form the second auxiliary reflected light $L_{a2}$, and the second auxiliary reflected light $L_{a2}$ is emitted to the first light path adjusting unit 6220. Next, the first light path adjusting unit 6220 will then reflect the second auxiliary reflected light $L_{a2}$ to form the first reflected light $L_2$ and the first reflected light $L_2$ is emitted to the second light path adjusting unit 6222. At last, the second light path adjusting unit 6222 will reflect the first reflected light $L_2$ to form the second reflected light $L_3$ and the second reflected light $L_3$ is emitted to the light sensing module 624. In addition, the light emitting module and the light sensing module of the optical touch system can be set on the left side and the right side of the bottom surface of the panel apparatus respectively, so that no redundant description is made here.

Please refer to FIG. 7. FIG. 7 illustrates a scheme diagram of the optical touch system rotating different angles to switch different scanning modes via the first auxiliary light path adjusting unit. As shown in FIG. 7, in the optical touch system 7, the back light source emitting apparatuses 720a~720c of the panel apparatus 70 are set outside the bottom surface of the panel apparatus 70 and used for providing the back light source needed when the panel apparatus 70 displays the screen. In this embodiment, the back light source emitting apparatuses 720b and 720c will be in the normal back light source emitting state and emit incident lights $L_{r1}$ and $L_{r2}$ to the panel apparatus 70. And, the incident light $L_4$ emitted from the back light source emitting apparatus 720a to the panel apparatus 70 will be reflected by the first auxiliary light path adjusting unit 7224 to form the first auxiliary reflected light $L_{a1}$ before the incident light $L_4$ is emitted into the panel apparatus 70. Then, the first auxiliary reflected light $L_{a1}$ will then be reflected by the second auxiliary light path adjusting unit 7226 to form the second auxiliary reflected light $L_2$ and the second auxiliary reflected light $L_{a2}$ will be emitted to the first light path adjusting unit 7220. Afterward, after the second auxiliary reflected light $L_a$ is reflected by the first light path adjusting unit 7220 to form the reflected light $L_2$ and then the reflected light $L_2$ is reflected by the second light path adjusting unit 7222 to form the reflected light $L_3$ to be emitted to the light sensing module 724. By doing so, the optical touch system 7 can effectively integrate the back light source emitter of the original panel apparatus 70 as the light source emitter which can determine the touch points, so that the cost and space of disposing additional light source emitter will be saved.

In addition, since the first auxiliary light path adjusting unit 7224 is rotational, so that when the incident light $L_4$ emitted from the back light emitting apparatus 720a is used to determine the touch points in the optical way, the first auxiliary light path adjusting unit 7224 will block the forward path of the incident light $L_4$ and reflect the incident light $L_4$. When the incident light $L_4$ emitted from the back light source emitting apparatus 720a is used as the back light source of the pane apparatus 70, the first auxiliary light path adjusting unit 7224 will rotate a specific angle so that the first auxiliary light path adjusting unit 7224 will not block the incident light $L_4$ emitted into the panel apparatus 70. By doing so, the optical touch system 7 can control the switching between the incident light $L_4$ emitted from the back light source emitting apparatus 720a as the back light source of the panel apparatus 70 or as the light source of determining touch points in the optical way.

It should be noticed that the panel apparatus 70 usually includes a plurality of liquid crystal units, when the parallel lights emitted from the panel apparatus 70 are emitted into the panel apparatus 70, since these liquid crystal units are rotational, so that these crystal units will control the strength of the emitting out light formed when the parallel lights pass through the liquid crystal units by adjusting their deflection angles, for example, the effects of total obstruction (no light), total passage (strong light), or partial passage (weak light), so that the panel apparatus 70 can provide different displaying effects. Therefore, the liquid crystal units of the panel apparatus 70 can also provide the switching function similar to the first auxiliary light path adjusting unit 7224 shown in FIG. 7. By controlling the rotation angles of the liquid crystal units, the incident light $L_4$ emitted form the back light emitting apparatus 720a can be switched to be the back light source of the panel apparatus 70 or the light source for determining the touch points in the optical way. By doing so, the optical touch system 7 can save the cost and the space of setting additional auxiliary light path adjusting units by integrating the liquid crystal units of the panel apparatus 70. In addition, if the incident light is not the parallel light, the panel apparatus 70 can also include a light polarizing unit, the light polarizing unit is used to adjust the incident light to be a parallel light, and the parallel light is emitted to those liquid crystal units, but not limited to this case.

Please refer to FIG. 8. FIG. 8 illustrates a scheme diagram of the optical touch system using the lateral light source emitter of the panel apparatus as the light emitting module. As shown in FIG. 8, in the optical touch system 8, after the sensing light $L_1$ emitted rightward from a lateral light source emitting apparatus 820 set outside the left side of the panel apparatus 80 is reflected by the first auxiliary light path adjusting unit 8224 to form an auxiliary reflected light $L_a$, the reflected light $L_a$ will be emitted to the first light path adjusting unit 8220. Afterward, the auxiliary reflected light $L_a$ will be reflected by the first light path adjusting unit 8220 to form a first reflected light $L_2$, and then the first reflected light $L_2$ will be reflected by the second light path adjusting unit 8222 to form a second reflected light $L_3$, and then the second reflected light $L_3$ will be reflected into the light sensing module 824.

Please refer to FIG. 9. FIG. 9 illustrates an example of the optical touch system including different types of light path adjusting units with different functions. As shown in FIG. 9, not only the first light path adjusting unit 9220 and the second light path adjusting unit 9222 with reflection function shown in the above-mentioned examples are set on the panel apparatus 90 of the optical touch system 9, but also the light path adjusting units 940 and 942 with other functions. For example, the light path adjusting unit 940 (or 942) can be the liquid crystal unit; the liquid crystal unit can adjust its deflection angle to control the strength of the incident light formed when the parallel light passes through the liquid crystal unit, for example, the effects of total obstruction (no light), total passage (strong light), or partial passage (weak light), to achieve the scanning switching effect. Additionally, the light path adjusting unit 940 (or 942) can be also the electro-wetting device, the electro-chromic device, or any other devices capable of providing similar scanning switching function without any limitations. The position of the light path adjusting unit 940 (or 942) in the optical touch system 9 can be adjusted based on practical needs, but not limited to this case. It should be noticed that the above-mentioned optical touch systems in various forms may have different configurations and positions; actually, there are still other configurations and positions, not limited to these cases.

The second embodiment of the invention is an optical touch system operating method. In this embodiment, the optical touch system includes a panel apparatus and an optical touch apparatus. The panel apparatus includes a first position and a second position different from the first position. The optical touch apparatus includes a light emitting module, a light path adjusting module, a light sensing module, and a processing module. The light emitting module and the light sensing module are set at the first position and the second position respectively. Please refer to FIG. 10. FIG. 10 illustrates a flowchart of the optical touch apparatus operating method. As shown in FIG. 10, in step S10, the light emitting module emits a sensing light. Next, in step S12, the light path adjusting module reflects the sensing light to form a reflected light. In this embodiment, the light path adjusting module includes a first light path adjusting unit and a second light path adjusting unit, the first light path adjusting unit and the second light path adjusting unit are set above a first side and a second side of a first surface of the panel apparatus respectively.

In fact, the first position and the second position can at the first side and the second side respectively, and correspond to the first light path adjusting unit and the second light path adjusting unit respectively, therefore, the sensing light emitted from the light emitting module can be reflected by the corresponding light path adjusting unit to form a first reflected light, and then, when the first reflected light is transmitted to the second light path adjusting unit above the first surface, the first reflected light will be reflected by the second light path adjusting unit to form the reflected light, but not limited to this case. For example, the light path adjusting module can include only singe light path adjusting unit, the light path adjusting unit can be set above the left side or the right side of the top surface, that is to say, the light path adjusting unit can correspond to the light emitting module or the light sensing module and used for reflecting the sensing light emitted from the light emitting module to form the reflected light. Moreover, the first position and the second position can also disposed in a first concave part of the first side and a second concave part of the second side respectively, and correspond to the first light path adjusting unit and the second light path adjusting unit respectively. Then, in step S14, the light sensing module receives the reflected light and generates a sensing result according to whether the light sensing module receives the reflected light. At last, in the step S16, the processing module determines the touch point position on the panel apparatus according to the sensing result.

Compared to the prior arts, the optical touch system and operating method thereof according to the invention can properly integrate the optical touch apparatus and the panel apparatus to save the entire usage space of the optical touch system and enlarge the range of its effective sensing region. In addition, the optical touch system can achieve the effect of switching scanning modes via the light path adjusting unit or the liquid crystal units of the panel apparatus without driving apparatus set in the prior arts.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch system, comprising:
a panel apparatus comprising a first position and a second position different from the first position; and
an optical touch apparatus, comprising:
    a light emitting module, set on the first position, for emitting a sensing light;
    a light path adjusting module, for reflecting the sensing light to form a reflected light;
    a light sensing module, set on the second position, for receiving the reflected light and generating a sensing result according to whether the light sensing module receives the reflected light; and
    a processing module, coupled to the light sensing module, for determining the touch point position formed on the panel apparatus according to the sensing result;
    wherein the light path adjusting module comprises a first light path adjusting unit and a second light path adjusting unit, the first light path adjusting unit and the second light path adjusting unit are set above a first side of a first surface of the panel apparatus and above a second side of the first surface respectively,
    wherein the light emitting module is a back-light source of the panel apparatus, the back-light source is disposed outside a second surface opposite to the first surface or outside a side surface different from the first surface and the second surface,
    wherein the light path adjusting module further comprises at least one auxiliary light path adjusting unit, the at least one auxiliary light path adjusting unit reflects an incident light emitted from the back-light source to form a first auxiliary reflected light emitted to the first light path adjusting unit, and
    wherein the at least one auxiliary light path adjusting unit is rotational, when the at least one auxiliary light path adjusting unit rotates to a first angle, the incident light emitted from the back light source emits to the panel apparatus to be the back-light source without being reflected by the at least one auxiliary light path adjusting unit, when the at least one auxiliary light path adjusting unit rotates to a second angle, the incident light emitted from the back light source is reflected by the at least one auxiliary light path adjusting unit to form the first auxiliary reflected light.

2. The optical touch system of claim 1, wherein the first position and the second position are disposed at the first side and the second side respectively, and the first position and the second position correspond the first light path adjusting unit and the second light path adjusting module respectively.

3. The optical touch system of claim 2, wherein the sensing light emitted from the light emitting module will be reflected by the corresponding first light path adjusting unit to form a first reflected light.

4. The optical touch system of claim 3, wherein if the first reflected light is transmitted to the second light path adjusting unit above the first surface, the first reflected light will be reflected by the second light path adjusting unit to form the reflected light.

5. The optical touch system of claim 1, wherein the first position and the second position are disposed in a first concave part of the first side and a second concave part of the second side respectively, and the first position and the second position correspond to the first light path adjusting unit and the second light path adjusting unit respectively.

6. The optical touch system of claim 1, wherein the first position and the second position are disposed at one side of the first surface and another side of a second surface opposite to the first surface, the light path adjusting module further comprises an auxiliary light path adjusting unit disposed above the another side of the second surface and corresponding to the second position, the auxiliary light path adjusting unit reflects the reflected light to form an auxiliary reflected light emitted to the light sensing module.

7. The optical touch system of claim 1, wherein the second position and the first position are disposed at one side of the first surface and another side of a second surface opposite to the first surface respectively, the light path adjusting module further comprises an auxiliary light path adjusting unit disposed above the another side of the second surface and corresponding to the first position, the auxiliary light path adjusting unit reflects the sensing light emitted from the light emitting module to form an auxiliary reflected light emitted to the first light path adjusting unit.

8. The optical touch system of claim 1, wherein the first position and the second position are disposed at a first side and a second side of a second surface opposite to the first surface respectively, the light path adjusting module further comprises a first auxiliary light path adjusting unit and a second auxiliary light path adjusting unit, the first auxiliary light path adjusting unit is disposed above the first side of the second surface and corresponding to the first position, the first auxiliary light path adjusting unit reflects the sensing light emitted from the light emitting module to form a first auxiliary reflected light emitted to the first light path adjusting unit, the second auxiliary light path adjusting unit is disposed above the second side of the second surface and corresponding to the second position, the second auxiliary light path adjusting unit reflects the reflected light to form a second auxiliary reflected light emitted to the light sensing module.

9. The optical touch system of claim 1, wherein the panel apparatus comprises at least one liquid crystal unit, the at least one liquid crystal unit is rotational, when a parallel light is emitted to the panel apparatus, when the parallel light passes the at least one liquid crystal unit, the at least one liquid crystal unit controls the strength of an emitting out light by adjusting a deflection angle of the at least one liquid crystal unit.

10. The optical touch system of claim 9, wherein the emitting out light is emitted out of the panel apparatus, the emitting out light can be also reflected by the first light path adjusting unit or the second light path adjusting unit to form a light distributing region above the first surface.

11. The optical touch system of claim 1, wherein a light path adjusting unit is set on the panel apparatus, the light path adjusting unit is a liquid crystal device, an electro-wetting device, or an electro-chromic device to provide a scanning switching function.

12. A method of operating an optical touch system, the optical touch system comprising a panel apparatus and an optical touch apparatus, the panel apparatus comprising a first position and a second position different from the first position, the optical touch apparatus comprising a light emitting module, a light path adjusting module, a light sensing module, and a processing module, the light emitting module and the light sensing module are set at the first position and the second position respectively, the method comprising the steps of:

the light emitting module emitting a sensing light;
the light path adjusting module reflecting the sensing light to form a reflected light;
the light sensing module receiving the reflected light and generating a sensing result according to whether the light sensing module receives the reflected light; and
the processing module determining the touch point position formed on the panel apparatus according to the sensing result;
wherein the light path adjusting module comprises a first light path adjusting unit and a second light path adjusting unit, the first light path adjusting unit and the second light path adjusting unit are set above a first side of a first surface of the panel apparatus and above a second side of the first surface respectively,
wherein the light emitting module is a back-light source of the panel apparatus, the back-light source is disposed outside a second surface opposite to the first surface or outside a side surface different from the first surface and the second surface,
wherein the light path adjusting module further comprises at least one auxiliary light path adjusting unit, the at least one auxiliary light path adjusting unit reflects an incident light emitted from the back-light source to form a first auxiliary reflected light emitted to the first light path adjusting unit, and
wherein the at least one auxiliary light path adjusting unit is rotational, when the at least one auxiliary light path adjusting unit rotates to a first angle, the incident light emitted from the back light source emits to the panel apparatus to be the back-light source without being reflected by the at least one auxiliary light path adjusting unit, when the at least one auxiliary light path adjusting unit rotates to a second angle, the incident light emitted from the back light source is reflected by the at least one auxiliary light path adjusting unit to form the first auxiliary reflected light.

13. The method of claim 12, wherein the first position and the second position are disposed at the first side and the second side respectively, and the first position and the second position correspond the first light path adjusting unit and the second light path adjusting module respectively, the sensing light emitted from the light emitting module will be reflected by the corresponding first light path adjusting unit to form a first reflected light.

14. The method of claim 12, wherein the first position and the second position are disposed at one side of the first surface and another side of a second surface opposite to the first surface, the light path adjusting module further comprises an auxiliary light path adjusting unit disposed above the another side of the second surface and corresponding to the second position, the auxiliary light path adjusting unit reflects the reflected light to form an auxiliary reflected light emitted to the light sensing module.

15. The method of claim 12, wherein the second position and the first position are disposed at one side of the first surface and another side of a second surface opposite to the first surface respectively, the light path adjusting module further comprises an auxiliary light path adjusting unit disposed above the another side of the second surface and corresponding to the first position, the auxiliary light path adjusting unit reflects the sensing light emitted from the light emitting module to form an auxiliary reflected light emitted to the first light path adjusting unit.

16. The method of claim 12, wherein the first position and the second position are disposed at a first side and a second side of a second surface opposite to the first surface respectively, the light path adjusting module further comprises a first auxiliary light path adjusting unit and a second auxiliary light path adjusting unit, the first auxiliary light path adjusting unit is disposed above the first side of the second surface and corresponding to the first position, the first auxiliary light path adjusting unit reflects the sensing light emitted from the light emitting module to form a first auxiliary reflected light emitted to the first light path adjusting unit, the second auxiliary light path adjusting unit is disposed above the second side of the second surface and corresponding to the second position, the second auxiliary light path adjusting unit reflects the reflected light to form a second auxiliary reflected light emitted to the light sensing module.

17. The method of claim 12, wherein a light path adjusting unit is set on the panel apparatus, the light path adjusting unit is a liquid crystal device, an electro-wetting device, or an electro-chromic device to provide a scanning switching function.

* * * * *